United States Patent [19]

Gerharz et al.

[11] Patent Number: 4,952,343
[45] Date of Patent: Aug. 28, 1990

[54] PROCESS FOR THE MANUFACTURE OF THIN PLATES WITH LOW BINDING STRENGTH

[75] Inventors: Norbert Gerharz, Hillscheid; Eduard Kessler, Bendorf; Albert Kleinevoss, Höhr-Grenzhausen; Hans Kleudgen; Jochen Kopia, both of Bendorf; Bernd Stein, Neuwied, all of Fed. Rep. of Germany

[73] Assignee: Didier-Werke AG, Wiesbaden, Fed. Rep. of Germany

[21] Appl. No.: 50,890

[22] Filed: May 15, 1987

[30] Foreign Application Priority Data

May 21, 1986 [DE] Fed. Rep. of Germany ....... 3617041

[51] Int. Cl.$^5$ ............................................. B29C 43/02
[52] U.S. Cl. ..................................... 264/109; 264/63; 264/122; 264/235; 264/346
[58] Field of Search ................. 264/63, 235, 346, 109, 264/122

[56] References Cited

U.S. PATENT DOCUMENTS 2,048,861 7/1936 Hagland .............................. 264/63
4,746,483 5/1988 Flockenhaus ........................ 264/63

FOREIGN PATENT DOCUMENTS 49097046 12/1972 Japan .
393244 2/1971 U.S.S.R. .

Primary Examiner—James Derrington
Attorney, Agent, or Firm—Nils H. Ljungman

[57] ABSTRACT

Very thin plates of ceramic material with low binding strength are difficult to manufacture, since the stability of the moldings is very low, so that they can hardly be fed to a subsequent treatment stage after shaping. Therefore, after the ceramic material is molded into plate-shaped moldings, these moldings are pushed onto a flat carrier in the plane of their plate surface and are heated on it for a few minutes, so that iron sulfates form, which impart dimensional stability to the moldings.

15 Claims, 2 Drawing Sheets

PROCESS FOR THE MANUFACTURE OF THIN PLATES WITH LOW BINDING STRENGTH

CROSS REFERENCE TO CO-PENDING APPLICATIONS

Co-pending application Ser. No. 768,508 (Attorney Docket No. NHL-DWA-10), filed on Aug. 22, 1985, now U.S. Pat. No. 4,672,052, entitled "Catalyst for Removal of Nitrogen Oxides from Exhaust Gases", which corresponds to Federal Republic of Germany patent application No. P 34 30 886.5, filed on Aug. 22, 1984; co-pending application Ser. No. 904,175, now U.S. Pat. No. 4,472,036 (Attorney Docket No. NHL-DWA-23), filed on Sept. 5, 1986, entitled "Catalyst Plate", which corresponds to Federal Republic of Germany patent application No. P 35 31 651.9, filed on Sept. 5, 1985; co-pending application Ser. No. 905,752, now U.S. Pat. No. 4,746,483. (Attorney Docket No. NHL-DWA-26), filed on Sept. 9, 1986, entitled "Process for the Manufacture of Catalyst Molding", which corresponds to Federal Republic of Germany patent application No. P 35 32 207.1, filed on Sept. 10, 1985; co-pending application Ser. No. 930,314, now abandoned. (Attorney Docket No. NHL-DWA-28), filed on Nov. 12, 1986, entitled "Mounting Board for Ceramic Plates", which corresponds to Federal Republic of Germany patent application No. P 35 39 888.4, filed on Nov. 11, 1985; co-pending application Ser. No. 930,315, now U.S. Pat. No. 4,762,689. (Attorney Docket No. NHL-DWA-29), filed on Nov. 12, 1986, entitled "Mounting Frame for Catalyst Plates", which corresponds to Federal Republic of Germany patent application No. P 35 39 887.6, filed on Nov. 11, 1985; and co-pending application Ser. No. 938,525, now U.S. Pat. No. 4,751,212. (Attorney Docket No. NHL-DWA-30), filed on Dec. 5, 1986, entitled "Process for the Manufacture of a Catalyst for the Reduction of Nitrogen Oxides in Exhaust Gases", which corresponds to Federal Republic of Germany patent application No. P 35 43 858.4, filed on Dec. 12, 1985, all of which are assigned to at least one of the same assignees as the instant application, are incorporated herein by reference as if the texts thereof were fully set forth herein.

Additionally, issued U.S. Pat. No. 4,656,148, issued Apr. 7, 1987, entitled "Method and Apparatus for the Reactivation of a Catalyst" is hereby made of record, is assigned to the same assignee as the instant application, and is incorporated herein by reference as if the text thereof was fully set forth herein.

BACKGROUND OF THE INVENTION

1. Field of the Invention:

The invention relates to a process for the manufacture of thin plates from a ceramic material with low binding strength.

2. Description of the Prior Art:

If very thin ceramic plates less than 2.5 millimeters thick are to be manufactured practically without a binder, significant problems will result during the manufacturing process, since such moldings cannot be removed from the mold mechanically, or by any other method, without damage.

In the manufacture of tiles, the tile moldings are fed to a kiln via a conveyor belt, whereby their edge strength is improved. Due to the comparatively great thickness of the tile moldings and their having a clay binder included in their composition, a handling strength is achieved which makes it possible to remove the moldings from the molding press. Usually no problems are experienced in the handling of the tile moldings. For the manufacture of plates such as catalyst plates, which plates are substantially thinner than tiles and whose ceramic material contains practically no binder phase, when they are removed from the mold, problems arise in their handling. The methods used for the manufacture of tiles are not appropriate for these thin plates.

OBJECT OF THE INVENTION

The object of the invention is a process of the type described above, whereby very thin plate-shaped moldings can be stabilized so that they can be handled without substantial damage.

SUMMARY OF THE INVENTION

The object is achieved by the invention in that after the ceramic material is formed into plate-shaped moldings, the moldings are ejected from the mold in the plane of their plate surface onto a flat carrier, whereby the sections, lying flat on the carrier, are heated for a few minutes, so that iron sulfates form, and so that only afterward are the moldings transported for subsequent treatment.

The moldings, therefore, are not lifted from the molder but are ejected directly onto the flat carrier from the molder. Their surface is supported by the mold and/or by the flat carrier so that they are not damaged in spite of their lack of stability.

As a result of the short-term heating of the moldings, iron sulfates are formed, which impart sufficient stability to the moldings for their subsequent treatment. The temperature treatment of the moldings immediately after molding results in a good green strength. Without the additional temperature treatment prior to subsequent treatment, the manufacture of such plates would hardly be possible.

The carrier can be constructed from a steel plate or a steel conveyor belt. For the heating of the moldings on the carrier, either the carrier itself can be heated, or it can be run through a kiln with molded plates disposed thereon.

One aspect of the invention resides broadly in a process for the manufacture of plates having substantial green strength from a ceramic material. The plates are substantially thin compared to the height and length of the plates, and, when initially formed and immediately thereafter, are so thin that they have a low strength to handling. The process comprises the step of mixing a ceramic material with a composition comprising a compound of sulfur. The ceramic material contains at least one iron compound. The process also comprises the step of molding the mixed ceramic material into molded shapes substantially in the form of the thin plates having at least one substantially flat surface substantially forming a plane. The at least one substantially flat surface is defined by the length and the height. The process further comprises the step of ejecting each molded shape from the mold in the plane of the flat surface, onto a carrier and heating the molded shapes for a predetermined time while the molded shapes are lying substantially flat on their at least one flat surface on their corresponding carrier. The heating for the predetermined time is conducted until iron sulfates form in the molded shapes and until the iron sulfates strengthen the molded shapes, thereby providing a substantially handleable thin plate having substantial green strength, whereby the thin plates subsequent to the heating and hardening are transportable substantially without damage and whereby any damage thereto is substantially minimized.

Another aspect of the invention resides broadly in a process for the manufacture of plates from a ceramic material. The plates are substantially thin compared to the height and length of the plates. The ceramic plates, when initially formed, are so thin that they have a low green strength to handling. The process comprises the steps of mixing components to form a ceramic material, molding the mixed ceramic material into molded shapes substantially in the form of the thin plates having at least one substantially flat surface defined by the length and the height, ejecting the molded shapes having low green strength from the mold in the plane of the flat surface onto a carrier, and heating the molded shapes for a predetermined time while the molded shapes are lying substantially flat with their at least one flat surface on their corresponding carrier. The heating for the predetermined time is conducted to provide a substantially handleable thin plate having substantial green strength, whereby the thin plates subsequent to the heating and hardening are transportable substantially without damage and whereby any damage is substantially minimized. The process further comprises the steps of removing the strengthened plates having improved green strength from the carrier, the improved green strength being substantially greater than the low green strength: transporting the plates having improved green strength from further processing; and treating the plates having improved green strength by further processing.

DESCRIPTION OF THE PREFERRED EMBODIMENTS

Figure 1:
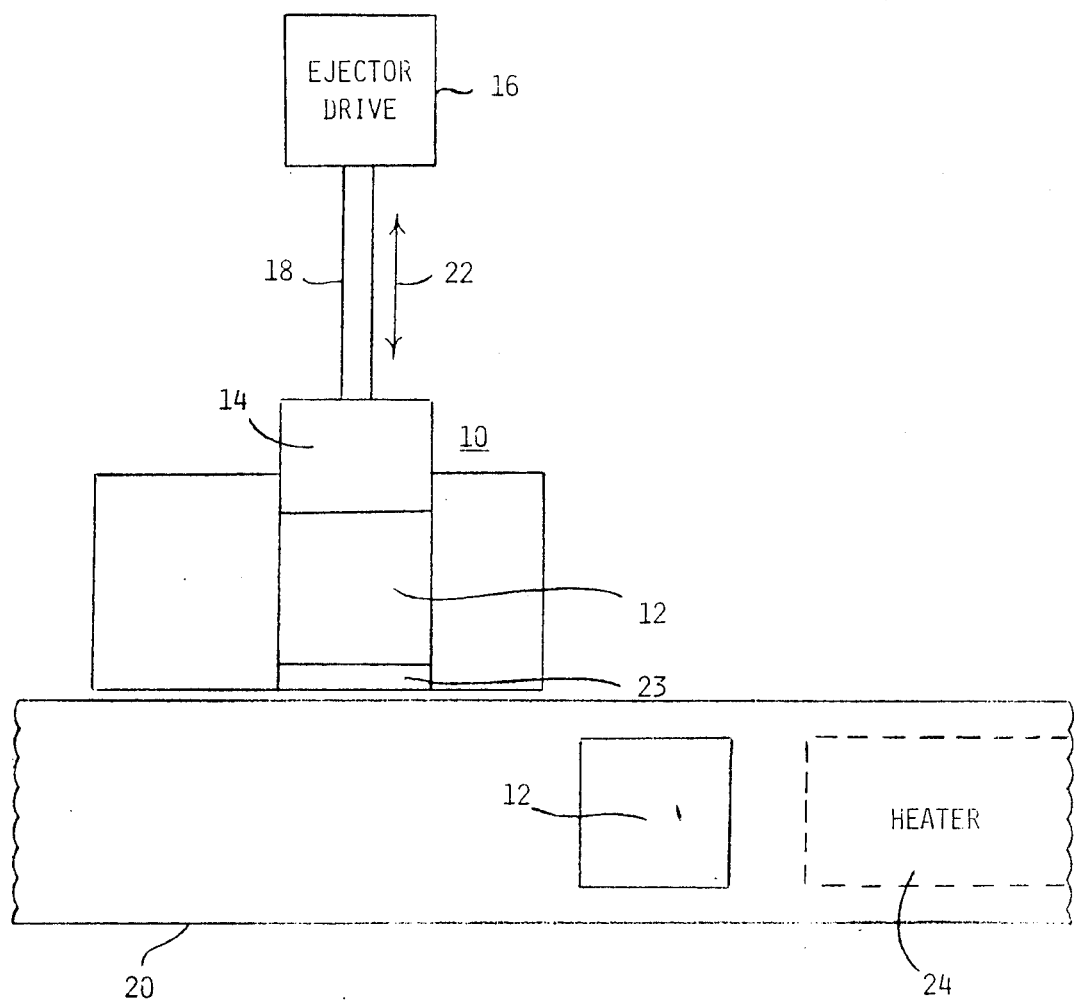
FIG. 1 shows a molding apparatus used for making thin plates according to an embodiment of the invention.

A first embodiment of the invention is described with the assistance of FIG. 1, which shows an open molding apparatus 10 which has just molded a thin ceramic plate 12. The top part of the molding apparatus 10 is not shown for clarity. An ejector mechanism 14 with an ejector mechanism drive 16 has a rod 18 which acts upon the ejector mechanism 14 to remove the ceramic plate 12 substantially parallel to the flat surface of the ceramic plate 12 onto preferably a steel conveyor belt 20. The molding apparatus 10 is preferably disposed very closely to the steel conveyor belt 20 such that the thin ceramic plate 12 is supported over a very large surface thereof at all times when the ceramic plate 12 is moved from the molding apparatus 10 to the steel conveyor belt 20. The rod 18 moves to and from in the direction of the double-headed arrow 22. The ejector mechanism 14 and the top of the mold (not shown) form the upper and lower portions (as shown in FIG. 1) of the molding apparatus 10. The upper portion of the mold closes the space 23 during the molding operation. A heater 24 is preferably disposed under the steel conveyor belt to heat the conveyor belt 20 and the ceramic plates 12 thereon. For added clarity only one of the ceramic plates 12 is shown disposed on the steel conveyor belt. Alternatively, the conveyor belt could be made up of a series of steel plates connected together or, as a further alternative, a series of individual steel plates movable on rollers, each for accepting one or more of the thin ceramic plates 12, which plate could be moved by the molding apparatus 10 to receive the ceramic plates 12 therefrom.

Figure 2:
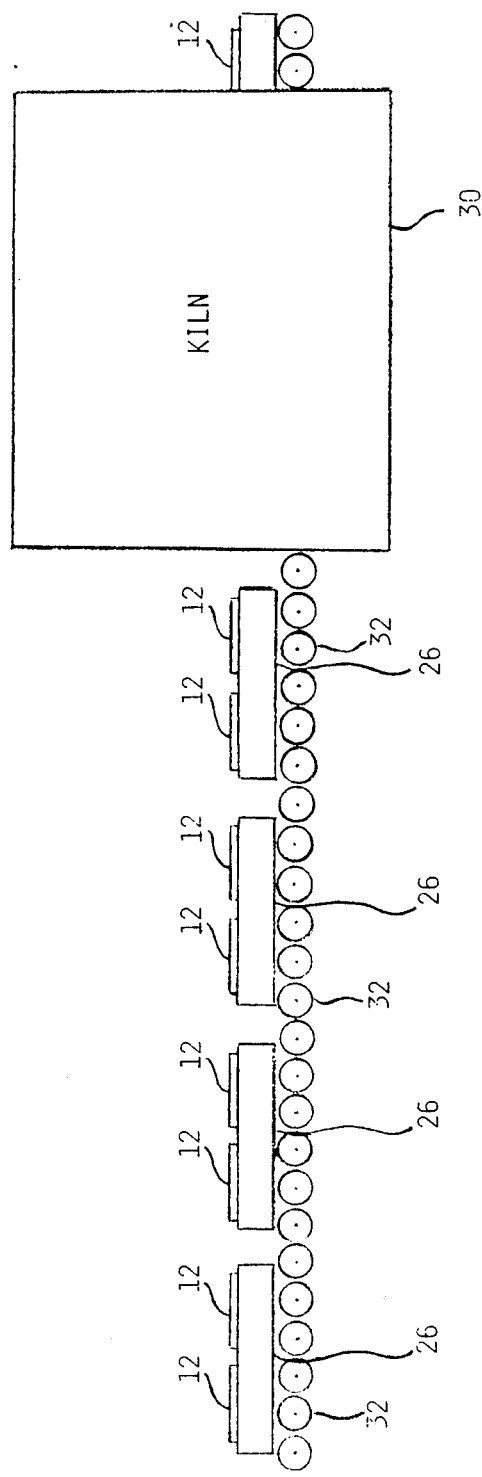
FIG. 2 shows a heating apparatus used for making thin plates according to an embodiment of the invention.

As shown in FIG. 2, a series of steel plates 26 are shown carrying a series of thin ceramic plates 12 thereon through a heating oven or kiln 30 in which the thin ceramic plates 12 are heated for a period of time, which may preferably be between two to seven minutes. The steel plates 26 are movably disposed on rollers 32.

According to one embodiment of the invention, moldings less than 2.5 millimeters thick are manufactured in a tile press, such as the molding apparatus 10, from a ceramic compound preferably without a separate binder phase being present therein at the time of unmolding. The moldings are pushed forward onto a major surface onto a flat steel plate in the plane of their plate surface. Their plate surface, for example, their large surface, is still supported during this thrust process by the mold and/or by the steel plate. The moldings, lying on the steel plate, are then heated for approximately two to seven minutes. This heating can be conducted either in a kiln or on a heated plate. This heating preferably causes the formation of iron sulfate in the moldings, imparting a stability in the moldings which permits the removal of the moldings from the steel plate without damaging them. The moldings can then be transported to a subsequent treatment stage for further treatment to, for example, harden the molded plates further and activate catalyst properties of the materials contained therein.

The basic material used to make the thin plates is preferably ceramic in nature and comprises, for example, oxidized iron compounds such as hematite, magnatite, and goethite. In order to provide the easily handleability without damage, the basic material is mixed with a small amount of sulfuric acid and water, and this mixture is then pressed to form the plates. The amounts of sulfuric acid and water are preferably both in the order of about one (1) percent to about five (5) percent. Unfortunately, once the plates are pressed, they are very fragile and are not easily handleable. The formed plates are then preferably placed on carriers to protect them from damage. These carriers with the plates thereon are then heated for a short period of time. The heating brings about a reaction between the sulfuric acid and the iron components, especially when these comprise iron hydroxide, and thereby, an iron sulfate is, or iron sulfates are, formed. The iron sulfate gives the plates such a strength that a further handling thereof without the use of carriers is possible.

In another embodiment of the invention the same result can be achieved if the iron oxides are mixed with a small amount of a dry resin. The resin mixed into the iron oxide comprises approximately about 0.5 percent to about 3.5 percent and preferably approximately 1.5 percent of the mixture. Some examples of resins which can be used are Novolak, Phenolharz (phenolic resin) and Hexamethylentetramin. The heating of the plates is preferably between about 0.5 to about 3 minutes and at a temperature of between about 150° C. and 400° C. This procedure provides the plates with a strength which will allow for the manipulation and handling thereof without the need for protective carriers.

Some examples of suitable primary materials for catalysts for making the plates are naturally occurring ferrous ores such as magnetite, hematite, or goethite. Modifications of these ores can also be used. For example, ores with their principal compositions indicated in the following table may be suitable:

|  | Sydvaranige Iron Ore Concentrate % | Lake Iron Ore Konrad Ore % |
| --- | --- | --- |
| Fe | 65.51 | 32.22 |
| $Fe^{2+}$ | 21.50 | 3.83 |
| Mn | 0.13 | 0.24 |
| P | 0.01 | 0.36 |
| $SiO_2$ | 7.73 | 14.52 |
| $Al_2O_3$ | 0.55 | 5.30 |
| CaO | 0.10 | 12.52 |
| MgO | 0.68 | 3.83 |
| $Cr_2O_3$ | — | — |

Another example of a substance for making the plates which may be a catalytic composition is:
 89 to 92 percent by weight of $Fe_2O_3$;
 3 to 4 percent by weight of $Fe_3O_4$; and the residue of other materials such as:
 4 to 5 percent by weight of $SiO_2$;
 1 to 2 percent by weight of $Al_2O_3$;
 0.01 to 0.2 percent by weight of MnO;
 0.01 to 0.03 percent by weight of CaO:
 0.01 to 0.02 percent by weight of MgO: and
 0.7 to 0.001 percent by weight of $V_2O_5$.

Another example of another catalytic composition may be:
 30 to 48 percent by weight of $Cr_2O_3$;
 12 to 30 percent by weight of $Fe_2O_3$;
 10 to 30 percent by weight of $Al_2O_3$;
 10 to 25 percent by weight of MgO; and
 1 to 5 percent by weight of $SiO_2$.

An example relating to the manufacture of a catalyst is one in which a natural goethite iron ore is screened to a required grain size range and then treated with sulfuric acid. After the acid treatment, the goethite iron ore is heated to a temperature which is approximately equal to the temperature at which it will be used during the catalytic reaction. When goethite iron ore is heated to more than 220° C., it can be converted to $Fe_2O_3$ which has a particular suitability for the catalytic reduction of nitrogen oxides from exhaust gases in a process using ammonia. As a result of the acid treatment, the activity of the Fe (III) oxide is further increased by sulfation. Therefore, the process results in an extraordinarily active, abrasion-resistant and impact-resistant catalyst material with a consistency which does not easily yield to compression and thus may be termed "compression-proof".

The granular goethite iron ore is smoothed, preferably after the screening and before the acid treatment, for example, by tumbling or polishing in a drum. Such a process reduces the edges on the granular material which are easily broken off by the smoothing. When the catalyst is formed or aggregated in bulk, this smoothing provides a more uniform pressure loss.

The acid treatment of the goethite iron ore is preferably done by drawing the natural goethite iron ore through a sulfuric acid bath, in which the sulfuric acid develops sufficient reaction capability. The sulfuric acid bath preferably has a concentration from 25 to 96% $H_2SO_4$.

The temperature for heating the goethite ore subsequent to treating with sulfuric acid may be in the range of 220° C. to 750° C., and in other ranges typically used in catalytic processes such as 220° C. to 1100° C., or 300° C. to 1100° C., and preferably in the range of 300° C. to 600° C. or under 500° C. Under unique conditions temperatures as low as 100° C. may be used, such as when the ore already contains large amounts of $Fe_2O_3$, the temperature ranges may be any of the temperatures mentioned in the patents incorporated herein by reference.

An example of the process for making a catalyst is as follows:
 Iron ore, comprising:
  approximately 20% goethite
  approximately 5% magnetite, and
  approximately 65% hematite
 is screened and then smoothed for 10 hours in a drum.

The ore may be mixed with 50% $H_2SO_4$ and then sulfated at 400° C.

Some examples of catalytic technology and typical temperatures of operation of catalysts are found in U.S. Pat. No. 4,259,312, entitled "Process and Apparatus for Catalytically Reacting a Reducing Gas and Water Vapor": U.S. Pat. No. 4,235,604, entitled "Method for Processing Coke Oven Gas": and U.S. Pat. No. 4,049,777, entitled "Method of Waste Gas Treatment", all of which are assigned to the same assignee as the present application.

Further examples of catalytic technology are found in U.S. Pat. No. 4,448,895, entitled "Process for Preparation of Catalyst for Cleaning Exhaust Gases and Catalyst Prepared for the Process" and U.S. Pat. No. 4,503,162, entitled "Catalyst Systems for the Conversion of Gases". Each of the above cited patents are incorporated herein by reference as if fully set forth in their entirety herein.

The exhaust gases to be treated by catalytic plates may include exhaust gases from power plants, exhaust gases from steel mills, exhaust gases from diesel engines, and exhaust gases containing sulfur trioxide.

An example of a molding machine or press is found in U.S. Pat. No. 4,443,171, entitled "Multi-motion Mechanical Press."

The invention as described hereinabove in the context of the preferred embodiments is not to be taken as limited to all of the provided details thereof, since modifications and variations thereof may be made without departing from the spirit and scope of the invention.

What is claimed is:

1. A process for the manufacture of green plates having substantial green strength, said plates being manufactured from a ceramic material with a low binding strength, said plates being substantially thin compared to the height and length of said plates, and said plates, when initially formed and immediately thereafter, being so thin that they have a low strength to handling the process comprising the steps of:
 mixing said ceramic material with a composition comprising a compound of sulfur, said ceramic material containing at least one iron compound;
 molding said mixed ceramic material into molded shapes substantially in the form of said thin plates having at least one substantially flat surface substantially forming a plane, said at least one substantially flat surface being defined by said length and said height;

ejecting each said molded shape, from said mold in the plane of said flat surface, onto a carrier;

heating said molded shapes at a temperature in the range of approximately 100° C. to approximately 1100° C. for a predetermined time while said molded shapes are lying substantially flat on their at least one flat surface on their corresponding carrier, said predetermined time being in the range of approximately two to approximately seven minutes;

said heating for said predetermined time being conducted until iron sulfates form in said molded shapes and until said iron sulfates strengthen said molded shapes, thereby providing a substantially handleable thin plate having substantial green strength, whereby said thin plates subsequent to said heating and strengthening are transportable substantially without damage and whereby any damage thereto is substantially minimized.

2. The process according to claim 1, wherein said heating comprises heating said carrier to heat said molded shapes.

3. The process according to claim 1, wherein said heating comprises heating said molded shapes disposed on their corresponding carriers in a kiln.

4. The process according to claim 1, wherein said molded shapes are pressed to a thickness of less than 2.5 millimeters during molding.

5. The process according to claim 1, wherein a steel plate is used as the carrier.

6. The process according to claim 1, wherein a steel conveyor belt is used as the carrier.

7. The process according to claim 2, wherein said heating comprises heating said carrier to heat said molded shapes.

8. The process according to claim 2, wherein said heating comprises heating said molded shapes disposed on their corresponding carriers in a kiln.

9. The process according to claim 1, wherein said molded shapes are pressed to a thickness of less than 2.5 millimeters during molding.

10. The process according to claim 2, wherein a steel plate is used as the carrier.

11. The process according to claim 2, wherein a steel conveyor belt is used as the carrier.

12. The process according to claim 1, wherein said sulfur compound for said mixing comprises sulfuric acid.

13. The process according to claim 12, wherein said mixing includes mixing water in said ceramic material.

14. The process according to claim 13, wherein said sulfuric acid comprises about 1 percent to about 5 percent of the mixed ceramic material and wherein said water comprises about 1 percent to about 5 percent of the mixed ceramic material.

15. The process according to claim 1, wherein said temperature range is approximately 150° C. to approximately 400°.

* * * * *